United States Patent [19]

Shoshani et al.

[11] 3,833,795

[45] Sept. 3, 1974

[54] METHOD AND MEANS FOR ASCERTAINING THE AUTHENTICITY OF SERIALLY NUMBERED OBJECTS

[75] Inventors: Avraham Shoshani, Kiryat Bialik; Dan Laor, Haifa; Dan Ben Zeev, Haifa; Dan Inbar, Haifa; Benjamin Prosper Sabbah, Haifa, all of Israel

[73] Assignee: Elscint Limited, Haifa, Israel

[22] Filed: July 26, 1972

[21] Appl. No.: 275,310

[30] Foreign Application Priority Data

Aug. 5, 1971 Israel .................................... 37456

[52] U.S. Cl. ........ 235/61.7 R, 101/110, 235/61.9 R

[51] Int. Cl. ........................................ G06k 3/00

[58] Field of Search ... 235/61.7 B, 61.7 R, 61.12 N; 340/149 A; 101/106, 110

[56] References Cited

UNITED STATES PATENTS 3,691,350 9/1972 Kuhns et al. .................. 235/61.7 B 3,711,683 1/1973 Hamisch, Sr. ................ 235/61.12 N

*Primary Examiner*—Daryl W. Cook

*Attorney, Agent, or Firm*—Kirschstein, Kirschstein, Ottinger & Frank

[57] ABSTRACT

Control over the authenticity of serially numbered objects is provided by applying an ordered pair of numbers (including alpha-numeric characters as well as any other type of indicia, visible or not visible, used for identification purposes and readable by humans and/or machines) to each object, one of the pair being serially selected and constituting an identification number, and the other of the pair being ramdomly selected and constituting a control number. A master list is kept of the ordered pairs of numbers as they are applied to objects so that the authenticity of an object can be ascertained at a later date by comparing the control number of an object with the control number in the master list associated with the identification number of the object.

8 Claims, 5 Drawing Figures

METHOD AND MEANS FOR ASCERTAINING THE AUTHENTICITY OF SERIALLY NUMBERED OBJECTS

This invention relates to a method and means for ascertaining the authenticity of serially numbered objects.

Recent advances in quality reproduction processes have increased the ease with which valuable documents such as stock certificates, cheques, paper currency and the like, can be counterfeited. Such documents are usually produced in large quantities and are serially numbered to facilitate establishing a control system by which the documents can be accounted for; but the use of serial numbers does not inhibit counterfeiting because the counterfeiter merely selects for the counterfeit objects a block of serial numbers consistent with the numbers found on legitimate objects. Except for the case where the serial numbers of a group of objects are known to be out of circulation, inspection of serial numbers is of no value in testing authenticity.

Being able to ascertain the authenticity of a serially numbered object by using the number of the object as an indicator, would have obvious advantages, the primary one being that such a system would be compatible with computer equipment whereby automated high speed checking of large numbers of objects can be effected. Considering bank notes, for example, the authenticity of such notes received by a commercial or government establishment, could be routinely scanned in the ordinary course of business prior to passing the notes back into general circulation. With high-speed equipment, the scanning process could even be carried out in real time upon deposit of the notes.

It is therefore an object of the invention to provide a method and means by which the number applied to an object for identification purposes can be used to check the authenticity of the object.

According to one aspect of the present invention, there is provided a method for ascertaining the authenticity of serially numbered objects by applying an associated pair of numbers (as defined below) to each object, one number of each pair of numbers constituting an identification number of the object, and the other number of the pair constituting a control number; each identification number is selected serially and each control number is selected randomly.

In accordance with a preferred embodiment, there is provided apparatus for carrying out the above described method, such apparatus comprising an identification number printer, a control number printer, a random number generator associated with and establishing the setting of said control number printer, and control means for causing the printers to print an identification number and a control number on an object.

As used in the present specification, the term "number" applied to the associated pair of numbers includes alpha-numeric characters, as well as any other type of indicia, visible or not visible, used for identification purposes and readable by humans and/or machines. Furthermore, the term "random numbers" means true random numbers, as well as Pseudo-random numbers, such as those numbers generated on the basis of computer algorithms or electronic noise.

For a better understanding of the present invention and to show how the same can be carried out in practice, reference should be made to the accompanying drawings in which.

Figure 1:
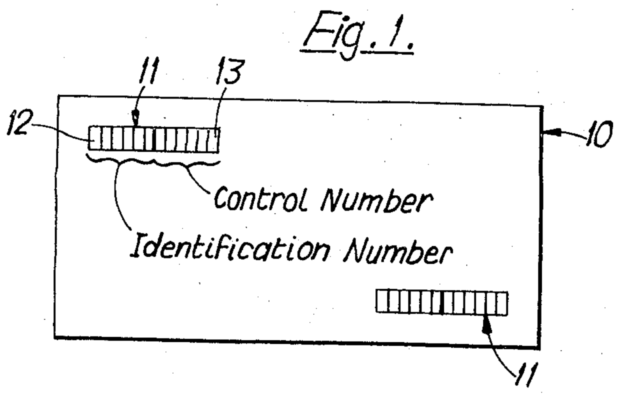
FIG. 1 represents a piece of paper currency bearing the associated numbers in accordance with one aspect of the present invention.

Referring now to FIG. 1, reference numeral 10 designates a typical object such as a stock certificate, cheque or paper currency produced in sufficient quantity and having sufficient value or importance to warrant the use of serial numbers to maintain accounting records.

Object 10 is provided with an associated pair of numbers indicated generally by reference numeral 11. One number of pair 11 constitutes identification number 12, and the other number of the pair constitutes control number 13.

Identification number 12 is selected serially as a set of objects is numbered. On the other hand, control number 13 is selected randomly so that there is no correlation between an identification number of an associated pair of numbers and the control number of the pair. Because of this arrangement, a counterfeiter serializing unauthorized objects will have no way of ascertaining the identity of the control numbers that are properly associated with the serial or identification numbers placed on the object. Only by chance, then, would it be possible to correctly assign the proper control numbers to the serial numbers. The probability for the correct control numbers to be selected is thus exceedingly small so that security against undiscovered counterfeiting is very great.

The above described approach to document protection requires that a master list be kept of the associated pairs of numbers applied to the objects. With this list in hand the authenticity of an object can be checked merely by ascertaining the identification number of the object, looking up that number in the master list, and obtaining the control number associated therewith. Checking is completed by comparing the control number obtained from the master list with the control number of the object. If a discrepancy exists, which is to say that the control number of the object being checked is not identical with the control number in the master list associated with the same identification number as that of the object being checked, then the object under scrutiny is a counterfeit.

Figure 2:
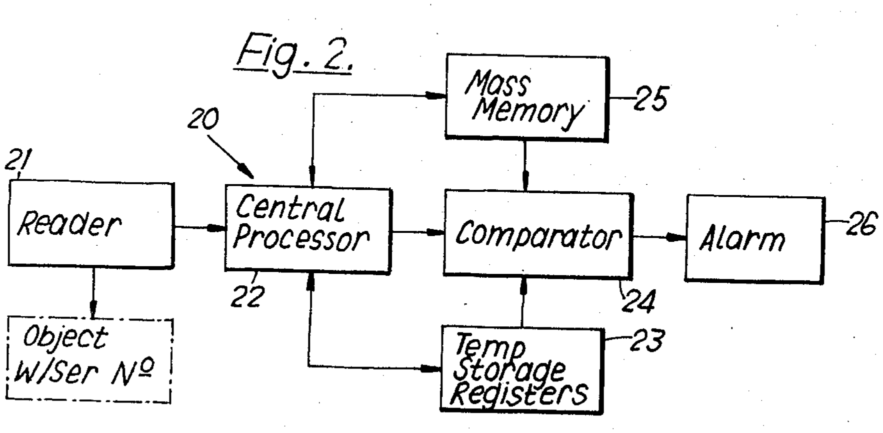
FIG. 2 is a block diagram representing the apparatus for checking the authenticity of an object numbered in accordance with one aspect of the present invention.

One form of apparatus for automatically checking the authenticity of a set of objects in accordance with the process described above is shown in detail in FIG. 2 to which reference is now made. Such apparatus, designated generally by reference numeral 20, includes reader 21 for sequentially scanning the associated numbers of the objects of the set processor 22 for identifying the associated pair of numbers from the information provided by reader 21, temporary storage registers 23 for storing the associated pairs of numbers together with their location in the set of objects and comparator register 24 for comparing the associated numbers derived from the object with the associated pairs of numbers of the master list stored in mass memory 25.

When a set of objects is to be checked for authenticity, associated apparatus (not shown) feeds the objects past the reader at a speed consistent with the capacity of the equipment to accept data. Processor 22, having identified the associated pairs of numbers, sends the data to registers 23 for temporary storage. When the data input process is completed, processor 22 rearranges the data in the registers to facilitate comparison with the data in mass memory 25. Specifically, the data in registers 23 are arranged in order by the identification numbers to facilitate the subsequent step-by-step comparison. That is to say, the identification number of an object is matched with the identification number in memory 25, and the control number associated with each identification number is compared. If the control numbers are identical, the cycle is repeated. If the control numbers are not identical, alarm 26 may be actuated and a record made of the location in the set where a discrepancy in control numbers has been detected. After the step-by-step analysis has been completed, the programming of processor 22 will cause an I/O device associated with the processor to print-out a list of discrepancies identifying their locations in the set of objects thus facilitating manual review.

It should be understood that the invention is not limited to the form of apparatus described above. For example, some computer equipment is exceptionally fast and provides "table-look-up" capability comparable in time with the interval between scanning objects. In such case, the authenticity check can be made in real time. It should also be understood that the scanning process is necessarily compatible with the system by which the numbers are applied to the object. For example, the scanning can be optical if the numbers are printed in ordinary or special fluorescent ink, or the scanning can be magnetic when the numbers are printed or otherwise deposited using magnetic ink. If coded apertures or coded magnetic dispositions are used for identification purposes, the scanning process will of course be compatible with these types of markings.

Where the objects are subject to complete control by the agency performing the authenticity check, it is possible to increase the security against counterfeiting. This is achieved by modifying the control number of an associated pair of numbers each time the authenticity of an object is checked. This approach increases the difficulty still further of successfully counterfeiting the objects. For example, the control number can be applied by way of magnetic indicia that is entirely machine readable. On checking the authenticity, the control number can be read, the authenticity verified using the basic technique described above, and another and different random number applied to the object. In such case, the master list would be updated to account for the change in control number.

The invention of the present application is ideally suited for a printing system which checks the accuracy with which the serialization of objects is achieved. Such printing system is illustrated in block diagram form in FIG. 3 to which reference is now made, and is designated generally by reference numeral 30. System 30 comprises printing press 31 by which an object to be printed is accepted. printed, and stored; printing press control means 33 for initiating and controlling the operation of both identification number printer 34 and random number printer 35 that form a part of printing press 31. In addition, system 30 includes processor 36 which provides operating signals to actuate printing control means 33; mass memory 37 associated with processor 36; and error print-out means 38 which operates in conjunction with reader 39 and comparator 40.

In the operation of system 30, control means 33 causes printers 34 and 35 to print an identification number and a control number respectively on object 32. The setting of each of printers 34 and 35 is established by signals provided by processor 36. Accordingly, processor 36 includes random number generator 41 which is associated with and establishes the setting of the numerator of printer 35. In addition, processor 36 includes serial number generator 42 which is associated with and establishes the setting of the numerator of printer 34. When an object to be printed is properly positioned relative to printers 34 and 35, control signals provided by processor 36 cause control means 33 to move the numerators of the printers into engagement with object 32. When the printing process is completed, the associated pair of numbers printed on the object is read by reader 39 which transmits information to comparator 40 wherein the number actually printed on an object is compared with the numbers which the control means 33 has ordered printers 34 and 35 to print. In the event a discrepancy occurs, comparator 40 provides an error signal to processor 36 which then causes error print-out means 38 to provide an entry which identifies the incorrectly printed associated numbers.

Serial number generator 42 may take the form of a conventional register which is incremented by a fixed amount after the completion of each printing operation. In this way, a sequential relationship between the identification numbers of sequentially printed objects is obtained. Generator 41 may continually produce random numbers which, under the control of the computer or processor 36 will be transferred to the control number printer 35. This printer will thus be incremented by a random amount after each printing operation is completed. In this manner, a random relationship between the control numbers of sequentially printed objects is obtained. In addition, there is a random relationship between the control number of a given object and its associated identification number.

When the processor 36 signals for control means 33 to effect the printing of an object, the contents of the two printers 34 and 35 are stored in mass memory 37 to provide the master list which is used when making an authenticity check of an object.

Figure 3:
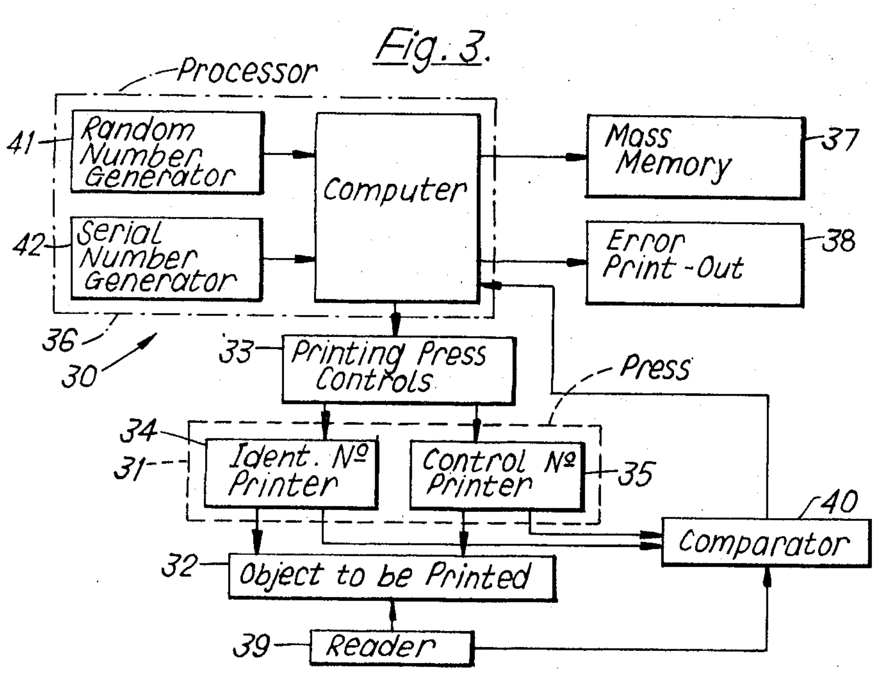
FIG. 3 is a block diagram representing the apparatus for numbering an object according to one aspect of the present invention, and checking on the accuracy of the numbering process.

It should be understood that the block diagram shown in FIG. 3 is illustrative of the general principles involved and does not necessarily reflect actual hardware for carrying out the processes described above. For example, printers 34 and 35 may take for form shown in FIGS. 4 and 5 to which reference is now made. In this case, identification printer 34' is a conventional numerator provided with a plurality of rotatable discs 43 containing indicia on the peripheral edge thereof. These discs are interconnected in a conventional manner so that the indexing of the disc in the unit position after the completion of a printing operation causes the discs to take relative positions which establish a sequential series to numbers as the numerator is sequentially engaged with objects to be printed. In this case, printer 34 operates as a serial number generator and eliminates the requirement for a special serial number generator associate with the computer of processor 36.

Figure 4:
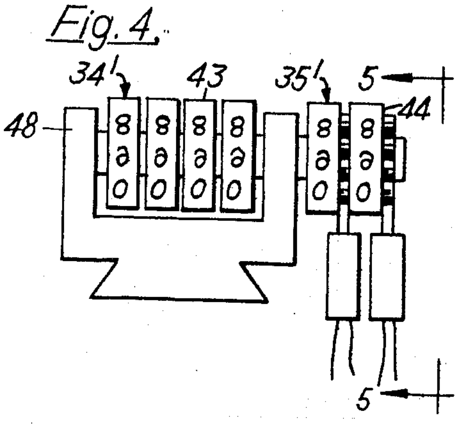
FIG. 4 is a side view of a numerating device suitable for use in the apparatus of FIG. 3.
Figure 5:
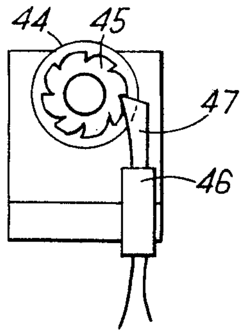
FIG. 5 is an end view of the device shown in FIG. 4, and is taken along the lines 5—5.

Control printer 35' shown in FIG. 4 also has one or more rotatable discs 44 mounted coaxially with the discs 43 of printer 34'. These discs also contain indicia on the peripheral edges thereof but are individually rotatable. Each disc 44 is provided with a ratchet wheel 45 rigidly connected therewith. Driver 46 associated with each disc 44 has a ratchet arm 47 operatively engaged with the teeth of ratchet wheel 45. The reciprocation of ratchet arm 47 caused by the operation of driver 46 imparts rotation to wheel 44. Thus, the angular position and hence the indicia to be printed on an object is determined by the signal supplied to driver 46.

The signals necessary to control drivers 46 and thus establish the control number, are derived through control means 33 from a random generator 41. Each bit-position of the random number generator operates the driver associated with the disc having the same bit-position on printer 35'. When the printers take the form shown in FIGS. 4 and 5, support 48 on which discs 43 and 44 are mounted is caused by printing control means 33 into and out of engagement with an object to be printed.

We claim:

1. Apparatus for providing control over the authenticity of a set of objects comprising a. a settable identification number printer;

b. a settable control number printer;

c. a random number generator associated with and establishing the setting of the control number printer; and d. control means for causing the printers to print an identification number and a control number on an object.

2. Apparatus in accordance with claim 1 wherein the identification number printer is set by incrementing it after each printing to establish a sequential relationship between the identification numbers of sequentially printed objects.

3. Apparatus according to claim 2 wherein the random number generator establishes a random relationship between the control numbers of sequentially printed objects and between the control number of one object and the identification number associated therewith.

4. Apparatus in accordance with claim 3 wherein each digit position of the control number printer has a rotatable disc containing indicia on the edge thereof selectively engageable with an object to be printed, and a driver associated with each disc and responsive to the output of the random number generator for establishing the angular position of the disc and hence the indicia to be printed on an object.

5. Apparatus in accordance with claim 4 including an identification number generator associated with and establishing the setting of the identification number printer.

6. Apparatus in accordance with claim 5 including comparator means for comparing the identification number and control number actually printed on an object as an ordered pair of numbers with the contents of the identification number and control number generators, and for responding to such a comparison by indicating when a discrepancy exists.

7. Apparatus according to claim 6 including an auxiliary printer for printing out those ordered pairs of numbers indicated by the comparator means whereby a list is obtained of those objects whose ordered pair of numbers has been improperly selected.

8. Apparatus for applying an ordered pair of numbers to each object of a set comprising:

a. an identification number printer, and a control number printer;

b. a control number printer having at least one rotatable disc;

c. means for regularly incrementing the identification number printer in response to printing an identification number on an object; and d. means for rotating the disc independently of the incrementing of the identification number printer including the disc in response to printing a control number on an object.

* * * * *